(12) United States Patent
Krishnamurthy et al.

(10) Patent No.: US 8,509,102 B2
(45) Date of Patent: Aug. 13, 2013

(54) THRESHOLD DETERMINATION IN TDOA-BASED POSITIONING SYSTEM

(75) Inventors: Sandeep H. Krishnamurthy, Arlington Heights, IL (US); Colin D. Frank, Park Ridge, IL (US)

(73) Assignee: Motorola Mobility LLC, Libertyville, IL (US)

( * ) Notice: Subject to any disclaimer, the term of this patent is extended or adjusted under 35 U.S.C. 154(b) by 517 days.

(21) Appl. No.: 12/712,191

(22) Filed: Feb. 24, 2010

(65) Prior Publication Data

US 2011/0205914 A1    Aug. 25, 2011

(51) Int. Cl.
*H04L 12/26* (2006.01)

(52) U.S. Cl.
USPC .......................... 370/252; 370/328; 370/332

(58) Field of Classification Search
USPC .......................................... 370/252, 328, 332
See application file for complete search history.

(56) References Cited

U.S. PATENT DOCUMENTS

| | | |
|---|---|---|
| 4,631,543 A | 12/1986 | Brodeur |
| 7,639,660 B2 | 12/2009 | Kim et al. |
| 7,940,740 B2 | 5/2011 | Krishnamurthy et al. |
| 2001/0034238 A1 | 10/2001 | Voyer |
| 2003/0222819 A1 | 12/2003 | Karr et al. |
| 2005/0134456 A1 | 6/2005 | Niu et al. |
| 2005/0135324 A1 | 6/2005 | Kim et al. |
| 2006/0019677 A1 | 1/2006 | Teague et al. |
| 2006/0209754 A1 | 9/2006 | Ji et al. |
| 2006/0256887 A1 | 11/2006 | Kwon et al. |
| 2006/0291393 A1 | 12/2006 | Teague et al. |
| 2007/0008108 A1 | 1/2007 | Schurig et al. |
| 2007/0049280 A1 | 3/2007 | Sambhwani et al. |
| 2007/0133462 A1 | 6/2007 | Guey |
| 2007/0153743 A1 | 7/2007 | Mukkavilli et al. |
| 2007/0223422 A1 | 9/2007 | Kim et al. |
| 2007/0280160 A1 | 12/2007 | Kim et al. |
| 2008/0002735 A1 | 1/2008 | Poirier et al. |
| 2008/0014960 A1 | 1/2008 | Chou |
| 2008/0089312 A1 | 4/2008 | Malladi |
| 2008/0095109 A1 | 4/2008 | Malladi et al. |
| 2008/0130626 A1 | 6/2008 | Ventola et al. |

(Continued)

FOREIGN PATENT DOCUMENTS

| | | |
|---|---|---|
| WO | 9921389 A1 | 4/1999 |
| WO | 2007052115 A2 | 5/2007 |

(Continued)

OTHER PUBLICATIONS

Patent Cooperation Treaty, "PCT Search Report and Written Opinion of the International Searching Authority" for International Application No. PCT/US2010/036982 Nov. 22, 2010, 17 pages.

(Continued)

*Primary Examiner* — Jason Mattis

(57) ABSTRACT

A method in a wireless communication terminal including receiving a signal comprising at least a Positioning Reference Signal (PRS) transmission from a serving cell and a PRS transmission from a neighbor cell, estimating a signal quality metric (SQM) based on the PRS transmission from the neighbor cell, estimating a time difference of arrival (TDOA) measurement for the neighbor cell based on the PRS transmissions, determining if the estimated SQM satisfies a criterion, and sending a report to the serving cell that includes at least the estimated TDOA if the criterion is satisfied.

13 Claims, 2 Drawing Sheets

(56) References Cited

U.S. PATENT DOCUMENTS

| | | |
|---|---|---|
| 2008/0132247 A1 | 6/2008 | Anderson |
| 2008/0133462 A1 | 6/2008 | Aylward et al. |
| 2008/0159239 A1 | 7/2008 | Odlyzko et al. |
| 2008/0167040 A1 | 7/2008 | Khandekar et al. |
| 2008/0170602 A1 | 7/2008 | Guey |
| 2008/0170608 A1 | 7/2008 | Guey |
| 2008/0212520 A1 | 9/2008 | Chen et al. |
| 2008/0232395 A1 | 9/2008 | Buckley et al. |
| 2008/0267310 A1 | 10/2008 | Khan et al. |
| 2008/0274753 A1 | 11/2008 | Attar et al. |
| 2008/0307427 A1 | 12/2008 | Pi et al. |
| 2009/0041151 A1 | 2/2009 | Khan et al. |
| 2009/0061887 A1 | 3/2009 | Hart et al. |
| 2009/0122758 A1 | 5/2009 | Smith et al. |
| 2009/0228598 A1 | 9/2009 | Stamoulis et al. |
| 2009/0238131 A1 | 9/2009 | Montojo et al. |
| 2009/0252077 A1 | 10/2009 | Khandekar et al. |
| 2009/0262699 A1 | 10/2009 | Wengerter et al. |
| 2009/0268675 A1 | 10/2009 | Choi |
| 2009/0285321 A1 | 11/2009 | Schulz et al. |
| 2010/0046460 A1 | 2/2010 | Kwak et al. |
| 2010/0056166 A1 | 3/2010 | Tenny |
| 2010/0103949 A1 | 4/2010 | Jung et al. |
| 2010/0118706 A1 | 5/2010 | Parkvall et al. |
| 2010/0118839 A1 | 5/2010 | Malladi et al. |
| 2010/0165882 A1 | 7/2010 | Palanki et al. |
| 2010/0167743 A1 | 7/2010 | Palanki et al. |
| 2010/0172310 A1 | 7/2010 | Cheng et al. |
| 2010/0172311 A1 | 7/2010 | Agrawal et al. |
| 2010/0182903 A1 | 7/2010 | Palanki et al. |
| 2010/0195566 A1 | 8/2010 | Krishnamurthy |
| 2010/0260154 A1 | 10/2010 | Frank et al. |
| 2010/0272094 A1 | 10/2010 | Byard et al. |
| 2010/0311437 A1 | 12/2010 | Palanki et al. |
| 2010/0323718 A1 | 12/2010 | Jen |
| 2011/0039583 A1* | 2/2011 | Frank et al. ............... 455/456.5 |
| 2011/0117925 A1 | 5/2011 | Sampath et al. |
| 2011/0143770 A1* | 6/2011 | Charbit et al. ............. 455/456.1 |
| 2011/0143773 A1* | 6/2011 | Kangas et al. ............. 455/456.1 |
| 2011/0148700 A1 | 6/2011 | Lasagabaster et al. |
| 2011/0149868 A1 | 6/2011 | Krishnamurthy et al. |
| 2011/0149903 A1* | 6/2011 | Krishnamurthy et al. .... 370/330 |
| 2011/0158200 A1 | 6/2011 | Bachu et al. |
| 2011/0190016 A1 | 8/2011 | Hamabe et al. |
| 2011/0244884 A1 | 10/2011 | Kangas et al. |
| 2011/0268101 A1 | 11/2011 | Wang et al. |
| 2011/0286349 A1* | 11/2011 | Tee et al. ...................... 370/252 |
| 2012/0002609 A1 | 1/2012 | Larsson et al. |
| 2012/0021769 A1 | 1/2012 | Lindoff et al. |

FOREIGN PATENT DOCUMENTS

| | | |
|---|---|---|
| WO | 2008033117 A1 | 3/2008 |
| WO | 2008137354 A1 | 11/2008 |
| WO | 2008137607 A2 | 11/2008 |
| WO | 2010080845 A2 | 7/2010 |

OTHER PUBLICATIONS

3GPP TS 25.305 V8.1.0 (Dec. 2008) 3rd Generation Partnership Project; Technical Specification Group Radio Access Network; Stage 2 functional specificaiton of User Equipment (UE) positiong in UTRAN (Release 8), 80 pages.

3GPP TSG RAN WG2 #66bis, R2-093855; "Evaluation of protocol architecture alternatives for positioning" Qualcomm Europe, et al., Jun. 29-Jul. 3, 2009, Los Angeles, CA, USA; 4 pages.

3GPP TS 36.305 V0.2.0 (May 2009) 3rd Generation Partnership Project; Technical Specification Group Radio Access Network; Evolved Universal Terrestrial Radio Access (E-UTRA); Stage 2 functional specification of User Equipment (UE) positioning in E-UTRAN (Release 9); 60pages.

3GPP TSG RAN WG1 #57, R1-091911; "Discussions on UE positioning issues" Nortel, May 4-8, 2009, San Francisco, USA; 12 pages.

3GPP TS 04.35 V8.3.0 (Jan. 2001) 3rd Generation Partnership Project; Technical Specification Group GSM EDGE Radio Access network; Location Services (LCS); Broadcast network Assistance for Enhanced Observed Time Difference (E-OTD) and Global Positioning System (GPS) Positioning Methods (Release 1999), 36 pages.

Patent Cooperation Treaty, "PCT Search Report and Written Opinion of the International Searching Authority" for International Application No. PCT/US2010/041451 Oct. 25, 2010, 16 pages.

3GPP TSG-RAN WG1 #57, R1-091912 "Simulation results on UE positioning using positioning reference signals" Nortel; San Francisco, USA, May 4-8, 2009, 11 pages.

3GPP TS 25.305 V8.1.0 (Dec. 2008) 3rd Generation Partnership Project; Technical Specification Group Radio Access Network; Stage 2 functional specificiation of User Equipment (UE) positioning in UTRAN (Release 9), 79 pages.

3GPP TSG-RAN WG1 #57, R1-091911 "Discussions on UE positioning issues" Nortel; San Francisco, USA, May 4-8, 2009, 12 pages.

3GPP TSG-RAN WG1 #58, R1-093406 "Positioning Subframe Muting for TODOA Measurements" Motorola; Shenzhen, P.R. China, 24-28 Aug. 24-28, 10 pages.

Patent Cooperation Treaty, "PCT Invitation to Pay Additional Fees" for International Application No. PCT/US2011/025607 Jun. 9, 2011, 13 pages.

3GPP TSG RAN WG1 #58, R1-095027 "Introduction of LTE Positioning" Ericsson et al., Jeju, South Korea; Nov. 9-13, 2009, 6 pages.

Patent Cooperation Treaty, "Search Report and Written Opinion" for International Application No. PCT/US2011/025607 Aug. 19, 2011, 21 pages.

United States Patent and Trademark Office, "Non-Final Rejection" for U.S. Appl. No. 12/492,339 dated Aug. 19, 2011, 14 pages.

United States Patent and Trademark Office, "Notice of Allowance and Fee(s) Due" for U.S. Appl. No. 13/040,090 dated Mar. 8, 2012, 6 pages.

Patent Cooperation Treaty, "PCT Search Report and Written Opinion of the International Searching Authority" for International Application No. PCT/US2011/044103 Oct. 24, 2011, 15 pages.

3GPP TSG RAN WG1 #59bis, Jan. 18-22, 2009, Jeju, Valencia, Spain, Change Request "Clarification of the CP length of empty OFDM symbols in PRS subframes" Ericsson, ST-Ericsson, Motorola, Qualcomm Inc, R1-100311; 2 pages.

United States Patent and Trademark Office, "Non-Final Rejection" for U.S. Appl. No. 12/542,374 dated Dec. 23, 2011, 23 pages.

United States Patent and Trademark Office, "Non-Final Rejection" for U.S. Appl. No. 12/573,456 dated Nov. 18, 2011, 10 pages.

United States Patent and Trademark Office, "Final Rejection" for U.S. Appl. No. 12/573,456 dated Mar. 21, 2012, 14 pages.

3GPP TS 36.211 v8.4.0 Technical Specification Group Radio Access Network; E-UTRA; Physical Channels and Modulation (Release 8); Sep. 2008; 78 pages.

3GPP TSG RAN WG1 #55bis, Ljubljana, Slovenia; Jan. 12-19, 2009, "On OTDOA in LTE" QUALCOMM, R1-090353, 8 pages.

3GPP TSG RAN #42, Athens, Greece, Dec. 2-5, 2008, "Positioning Support for LTE" Article 39, 3GPP TR 21.900; RP-080995, 6 pages.

USPTO Notice of Allowance for U.S. Appl. No. 12/365,166 Apr. 16, 2010, 11 pages.

USPTO Notice of Allowance for U.S. Appl. No. 12/365,166 Aug. 25, 2010, 9 pages.

3GPP TS 36.211 V9.0.0, Technical Specification Group Radio Access Network, E-UTRA, "Physical Channels and Modulation (Release 9)" Dec. 2009, 85 pages.

3GPP TS 36.213 V9.0.0, Technical Specification Group Radio Access Network, E-UTRA, "Physical layer procedures (Release 9)" Dec. 2009, 79 pages.

3GPP TS 36.355 V9.0.0, Technical Specification Group Radio Access Network, E-UTRA, "LTE Positioning Protocal (LLP) (Release 9)" Dec. 2009, 102 pages.

USPTO Patent Application Titled "Restrictions on Autonomous Muting to Enable Time Difference of Arrival Measurements" U.S. Appl. No. 61/295,678, filed Jan. 15, 2010.

3GPP TSG RAN1 #57, Jun. 29-Jul. 3, 2009, Los Angeles, CA, USA, "On Serving Cell Muting for OTDOA Measurements" Motorola, R1-092628; 7 pages.

3GPP TSG RAN WG1 #56bis, Mar. 23-27, 2009, "Further details on DL OTDOA" Ericsson, R1-091312, 6 pages.
3GPP TSG RAN WG1 #59, Nov. 9-13, 2009, Jeju, South Korea, "Introduction of LTE Positioning" Ericsson et al.; R1-094429, 5 pages.
3GPP TSG RAN WG4 #53, Nov. 9-13, 2009, Jeju, South Korea; "System simulation results for OTDOA" Ericsson, R4-094532; 3 pages.
USPTO Patent Application Titled "Interference Control SINR Optimization and Signaling Enhancements to Improve the Performance of OTDOA Measurements" U.S. Appl. No. 12/813,221, filed Jun. 10, 2010.
3GPP TSG RAN WG1 #55bis; Ljubjana, Slovenia; Jan. 12-16, 2009, "Improving the hearability of LTE Positioning Service" Alcatel-Lucent, R1-090053, 5 pages.
Patent Cooperation Treaty, "PCT Invitation to Pay Additional Fees and, where Applicable, Protest Fee" for International Application No. PCT/US2010/038257 Oct. 1, 2010, 9 pages.
3GPP TSG RAN WG4 (Radio) #20, New Jersey, USA; Nov. 12-16, 2001, "UTRAN SFN-SFN observed time difference measurement & 3GPP TS 25.311 IE 10.3.7.106 UE positioning OTDOA neighbour cell info' assistance data fields", Tdoc R4-011408, 4 pages.
John P. Costas, "A Study of a Class of Detection Waveforms Having Nearly Ideal Range-Doppler Ambiguity Properties," Proc. IEEE, vol. 72, No. 8, Aug. 1984, pp. 996-1009.
Jiann-Ching Guey, "Synchronization Signal Design for OFDM Based on Time-Frequency Hopping Patterns", Proceedings of IEEE International Conference on Communications, 2007, pp. 4329-4334.
3GPP TSG RAN WG1 #56bis, Mar. 23-27, 2009, Seoul, South Korea; "Reference Signals for Low Interference Subframes in Downlink" Ericsson, R1-091314; 8 pages.
3GPP TSG RAN WG1 #58, Aug. 24-28, 2009, "LS on assistance information for OTDOA positioning support for LTE" R1-093729, 3 pages.
Patent Cooperation Treaty, "PCT Search Report and Written Opinion of the International Searching Authority" for International Application No. PCT/US2010/030516 Oct. 8, 2010, 24 pages.
3GPP TSG RAN WG1 #56, Athens, Greece; Feb. 9-13, 2009 "On OTDOA method for LTE Positioning" Ericsson, R1-090918, 6 pages.
USPTO Patent Application Titled "Method and Apparatus for Transmitting Positioning Reference Signals in a Wireless Communication Network" U.S. Appl. No. 12/870,148, filed Aug. 27, 2010.
3GPP TSG RAN WG1 #58, Aug. 24-28, 2009, Shenzhen, China, "Draft CR 36.211 Introduction of LTE Positioning", R1-093603; 5 pages.
3GPP TSG RAN WG1 #59, Nov. 9-13, 2009, Jeju, South Korea, Change Request 36.211 "Introduction of LTE positioning" Ericsson, R1-095027; 6 pages.
3GPP TSG RAN WG1 #58, Aug. 24-28, 2009, Shenzhen, China, "Draft CR 36.213 Introduction of LTE Positioning", R1-093604; 3 pages.
3GPP TSG RAN WG1 #58, Aug. 24-28, 2009, Shenzhen, China, "Draft CR 36.214 Introduction of LTE Positioning", R1-093605; 6 pages.

3GPP TSG RAN WG1 #59, Nov. 9-13, 2009, Jeju, South Korea, "Text proposal on Orthonogonal PRS transmissions in mixed CP deployments using MBSFN subframes" Motorola, R1-095003; 4 pages.
3GPP TSG RAN WG1 #59, Nov. 9-13, 2009, Jeju, South Korea, Change Request 36.214 "Introduction of LTE positioning" Ericsson, et al., R1-094430; 4 pages.
3GPP TSG RAN WG1 #58bis, Oct. 12-16, 2009, Miyazaki, Japan, Change Request 36.213 "Clarification of PDSCH and PRS in combination for LTE positioning" Ericsson, et al., R1-094262; 4 pages.
USPTO Patent Application Titled "A Wireless Terminal and Method for Managing the Receipt of Position Reference Signals for Use in Determining a Location" U.S. Appl. No. 12/492,339, filed Jun. 26, 2009.
3GPP TSG RAN WG1 #56bis, Feb. 9-13, 2009; Athens, Greece; PHY Layer Specification Impact of Positiong Improvements Qualcomm Europe, R1-090852, 3 pages.
USPTO Patent Application Titled "Muting Time Masks to Suppress Serving Cell Interference for Observed Time Difference of Arrival Location" U.S. Appl. No. 12/542,374, filed Aug. 17, 2009.
3GPP TSG RAN3 #68, May 10-14, 2010, Montreal, Canada "Addition of PRS Muting Configuration information to LPPa" Ericsson, R3-101526, 7 pages.
3GPP TSG RAN2 #70, May 10-14, 2010, Montreal, Canada "Signalling support for PRS muting in OTDOA" Ericsson, ST-Ericsson; R2-103102, 2 pages.
USPTO Patent Application Titled "Autonomous Muting Indication to Enable Improved Time Difference of Arrival Measurements" U.S. Appl. No. 12/573,456, filed Oct. 5, 2009.
3GPP TSG RAN1 #58 Aug. 24-28, 2009, Shenzhen, P.R. China, "Positioning Subframe Muting for OTDOA Measurements" Motorola, R1-093406; 9 pages.
3GPP TS 36.211 V8.6.0, Technical Specification Group Radio Access Network; E-UTRA; Physical Channels and Modulation: (Release 8) Mar. 2009; 83 pages.
United States Patent and Trademark Office, "Non-Final Rejection" for U.S. Appl. No. 12/542,374 dated Aug. 31, 2012, 28 pages.
United States Patent and Trademark Office, "Non-Final Office Action" for U.S. Appl. No. 12/973,467 dated Mar. 28, 2013, 10 pages.
Japanese Patent Office; Office Action for Japanese Patent Application No. 2012-503786 dated Apr. 2, 2013, 6 pages.
3GPP TSG RAN1 #56bis, R1-091336 "Study on hearability of reference signals in LTE positioning support" Motorola; Seoul, South Korea; Mar. 23-29, 2009; 8 pages.
United States Patent and Trademark Office, "Non-Final Rejection" for U.S. Appl. No. 13/759,089 dated Apr. 18, 2013, 17 pages.
United States Patent and Trademark Office, "Non-Final Rejection" for U.S. Appl. No. 12/756,777 dated Apr. 19, 2013, 18 pages.

* cited by examiner

Remote unit receives a signal including a Positioning Reference Signal (PRS) transmission from a serving cell and a PRS transmission from a neighbor cell

220

Remote unit estimates a TDOA measurement for the neighbor cell based on the PRS transmissions received from the serving cell and the neighbor cell

230

Remote unit estimates a signal quality metric (SQM) based on the PRS transmission from the neighbor cell

240

Remote unit determines if the estimated SQM satisfies a criterion threshold $T\_X1 \leq SQM \leq$ threshold $T\_X2$

250

Remote unit sends a report to the serving cell including at least the PCID of the neighbor cell and the estimated TDOA if the criterion is satisfied.

THRESHOLD DETERMINATION IN TDOA-BASED POSITIONING SYSTEM

FIELD OF THE DISCLOSURE

The present disclosure relates generally to wireless communications and, more particularly, to Time Difference of Arrival (TDOA) measurement estimates and signaling in wireless communication terminals and methods.

BACKGROUND

In 3GPP LTE Rel-9, transmission of a Positioning Reference Signal (PRS) in the so-called PRS subframe is enables User Equipment (UE) to detect neighbor cell sites and obtain Time-Difference Of Arrival (TDOA) measurements from the neighbor sites. The PRS is transmitted on non-control OFDM symbols of either a normal subframe or a Multimedia Broadcast over Single Frequency Network (MBSFN) subframe with ⅙ re-use in the frequency domain. In other words, the PRS is transmitted on one subcarrier out of every 6 subcarriers. Further, the shift in frequency domain is determined based on Physical Cell Identifier (PCID) as v_shift=mod (PCID, 6). Frequency reuse improves hearability or the detection Signal to Interference Ratio (SINR) of PRS. As a result, more cells can be detected and measured reliably by the UE.

The UE makes use of the Neighbor Cell List (NCL) and tests for the presence or absence of target neighbor cells by estimating the signal strength of the neighbor cell and comparing it against a threshold. Alternatively, the UE can compute a function based on the neighbor cell signal strength such as the PRS SINR of the neighbor for comparison against a threshold. If a neighbor cell satisfies a suitable threshold criterion, the UE reports to the serving cell that the neighbor was "detected". The UE may also report the TDOA for the detected neighbor cell. If the UE reports a neighbor cell when the UE is not within the Down Link (DL) reception range of that neighbor, or equivalently, when the received signal strength of the neighbor cell is such that TDOA cannot be accurately estimated, then the report is "false". False reports can limit the ability of the location server, especially when the false reports are persistent. In LTE Rel-9, the NCL size is 24 and the network typically includes a neighbor cell in the NCL because the UE may be in the DL reception range of that neighbor and the network does not know a priori whether or not the UE can hear that neighbor with sufficient signal strength to measure TDOA accurately or even detect that neighbor. As a result, if a UE falsely detects a neighbor repeatedly even when the UE is not within the DL reception range of the falsely detected neighbor, the location server has no way of identifying that the TDOA report for that neighbor is erroneous. The location server must then include the false report in its position coordinate computation, resulting in the degradation of positioning accuracy.

Neighbor cells with a PRS pattern that overlaps the serving cell PRS pattern (i.e., mod(PCID_neighbor, 6)=mod(PCID_ serving, 6)) are strongly interfered with by the serving cell signal. The PRS signal in the frequency domain comprises a pseudo-random QPSK sequence, which is a Gold sequence mapped to a QPSK constellation, and is typically transmitted across the DL transmission bandwidth. The sequences used for different PCIDs are different allowing for a processing gain for both time and frequency domain methods for separating the PRS received from two different cells. Both the detection reliability (i.e., probability of correct detection) and TDOA estimation accuracy degrade when the serving cell received power increases relative to the target neighbor cell received power.

For neighbor cells that have a PRS pattern different from the serving cell PRS pattern (i.e., mod(PCID_neighbor, 6) not equal to mod(PCID_serving, 6)), the serving cell signal does not interfere with neighbor cell measurement when the signals are time aligned. However, when the sum of the channel delay spread and time difference of arrival exceeds the cyclic prefix (CP) of the OFDM symbol, and when the serving cell signal is comparable in strength relative to a neighbor cell, the serving cell signal "leaks" into the neighbor cell signal measurement irrespective of what method is used in receiver processing (e.g., time domain correlation with coherent/non-coherent accumulation, post-FFT frequency-domain joint signal strength estimation, etc.). This limits the detection reliability of neighbor cells and increases the false reporting rate.

Further, autonomous muting is allowed in 3GPP specification TS 36.213 v9.0.1 which means that the UE must blindly detect whether or not the PRS is present in a PRS subframe on a subframe-by-subframe basis. The UE takes a TDOA measurement only when it detects the presence of PRS. Autonomous muting enables the UE to take a TDOA measurement for a neighbor cell in subframes in which there is no serving cell PRS transmission and as a result measurements of the neighbor cell PRS are of a much higher quality from a PRS SINR perspective.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

BRIEF DESCRIPTION OF THE DRAWINGS

FIG. 2 is a process flow diagram.

DETAILED DESCRIPTION

Figure 1:
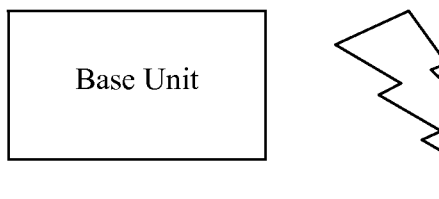
FIG. 1 illustrates a wireless communication system.
Figure 1:
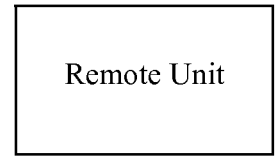
Figure 1:
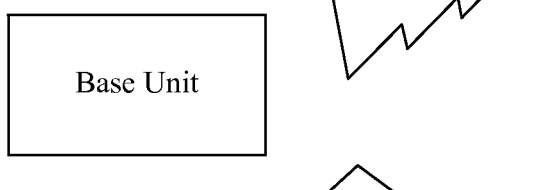
Figure 1:
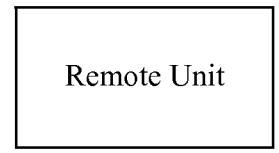

In FIG. 1, a wireless communication system 100 comprises one or more fixed base infrastructure units 101, 102 forming a network distributed over a geographical region for serving remote units in the time and/or frequency and/or spatial domain. A base unit may also be referred to as an access point, access terminal, base, base station, Node-B (NB), eNode-B (eNB), Home Node-B (HNB), Home eNode-B (HeNB), Macro eNode-B (MeNB), Donor eNode-B (DeNB), relay node (RN), femtocell, femto-node, network node or by other terminology used in the art. The one or more base units each comprise one or more transmitters for downlink transmissions and one or more receivers for uplink transmissions. The base units are generally part of a radio access network that includes one or more controllers communicably coupled to one or more corresponding base units. The access network is generally communicably coupled to one or more core networks, which may be coupled to other networks like the Internet and public switched telephone networks among others. These and other elements of access and core networks are not illustrated but are known generally by those having ordinary skill in the art.

In FIG. 1, the one or more base units serve a number of remote units 103, 104 within a corresponding serving area, for example, a cell or a cell sector, via a wireless communication link. The remote units may generally be fixed or mobile. The remote units may also be referred to as subscriber units, mobiles, mobile stations, mobile units, users, terminals, subscriber stations, user equipment (UE), user terminals, wireless communication devices, relay nodes, or by other terminology used in the art. The remote units also comprise one or more transmitters and one or more receivers. In FIG. 1, the base unit 101 transmits downlink communication signals to serve remote unit 103 in the time and/or frequency and/or spatial domain. The remote unit 104 communicates with base unit 102 via uplink communication signals. Sometimes the base unit is referred to as a serving or connected or anchor cell for the remote unit. The remote units may also communicate with the base unit via a relay node. Generally, the remote unit communicates with a serving base unit (serving cell,) and one or more neighboring base units (neighbor cells). In FIG. 1, the base unit 101 is a serving cell for remote unit 103 and the base unit 102 is a neighbor cell for remote unit 103. The base unit 102 may also be a serving cell for remote unit 104. Similarly, the base unit 101 may be a neighbor cell for remote unit 102.

The wireless communication network also includes a location server or an equivalent entity to determine the location of the remote unit as is known generally. Alternatively, one of the base stations may act as the location server. Each base unit generally broadcasts a positioning reference signal (PRS) to be received by the remote units. The positioning reference transmission may be a set of one or more positioning reference symbols (PRS) of various values arranged in a pattern unique to the base station sending the positioning reference transmission.

In one implementation, the wireless communication system is compliant with the 3GPP Universal Mobile Telecommunications System (UMTS) LTE protocol, also referred to as EUTRA or 3GPP LTE or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. The instant disclosure is particularly relevant to 3GPP LTE Release 8 (Rel-8) and LTE Release 10 (Rel-10), but may also be applicable to other wireless communication systems. More generally the wireless communication system may implement some other open or proprietary communication protocol, for example, IEEE 802.16(d) or 802.16(e) (WiMAX), among other existing and future protocols. The disclosure is not intended to be implemented in any particular wireless communication system architecture or protocol. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division multiplexing/multiple access techniques, or a combination of these various techniques. In alternate embodiments, the wireless communication system may utilize other communication system protocols including, but not limited to, TDMA or direct sequence CDMA. The communication system may be a TDD (Time Division Duplex) or FDD (Frequency Division Duplex) system.

In the process 200 of FIG. 2, at 210, a UE receives a signal including a Positioning Reference Signal (PRS) transmission from a serving cell and a PRS transmission from a neighbor cell. In FIG. 1, for example, the remote unit 103 receives PRS transmission from serving cell 101 and from neighbor cell 102. At 220, the UE estimates a time difference of arrival (TDOA) measurement for the neighbor cell relative to the serving cell based from the received signal and knowledge of the PRS transmissions from the serving cell and from the neighbor cell (correlate the received signal against the known PRS signals—which are different for each PCID—to estimate the TDOA of the neighbor cell relative to the serving cell.) At 230, the remote unit estimates a signal quality metric (SQM) for the PRS transmission from the neighbor cell as observed at the UE from the received signal (Alternatively, the SQM is for the TDOA estimate for the neighbor cell rather than for the PRS signal received from the neighbor cell). The estimation of the TDOA measurement and the signal quality measurement need not necessarily occur in the order suggested in FIG. 2. In other embodiments, the ordering of these estimations may be reversed. These estimations may also be performed simultaneously or at least partially concurrent in the time domain. At 250, the remote unit sends a report to the serving cell including at least the estimated TDOA if the criterion is satisfied.

In one embodiment, the SQM metric corresponds to an estimation of power of the PRS transmission from the neighbor cell received at the wireless communication terminal. In another embodiment, the remote unit determines a noise measurement based on a signal from which an estimation of power of the PRS transmission from the neighbor cell received at the wireless communication terminal was obtained. In one embodiment, for example, the noise measurement is a signal-to-noise ratio (SNR) or signal to interference ratio (SINR). According to this latter embodiment, the signal quality metric is based on an estimation of power of the PRS transmission (P-RSRP) from the neighbor cell and the noise measurement. In a more particular implementation, the SQM metric is proportional to a ratio of P-RSRP and the noise measurement.

In FIG. 2, at 240, the remote unit determines if the estimated SQM satisfies a first criterion: threshold T_X1<=SQM<=threshold T_X2. In one embodiment, at least one of the thresholds T_X1 or T_X2 is based on a physical channel identifier (PCID) of the serving cell and a PCID of the neighbor cell. In a more particular implementation, the remote unit determines whether a PRS pattern of the serving cell overlaps a PRS of the neighbor cell. Such a determination may be made by computing a PRS frequency offset as mod(PCID serving cell-PCID neighbor cell, 6). The leakage of the serving cell PRS into the neighbor cell TDOA measurement is a function of this frequency offset, and thus the thresholds T_X1 and T_X2 may in general be a function of this frequency offset, since with more serving cell leakage, a larger threshold is need to protect against false reporting. In general, the leakage decreases with the function abs(mod(PCID serving cell−PCID neighbor cell, 6)-3)

where abs( ) denotes the absolute value of the quantity in the brackets ( ). This distance measure is used because there are only 6 possible PRS offsets, and as a result, if the difference PCID serving cell-PCID neighbor cell is equal to 6, the PRS patterns of the serving cell and the neighbor cell overlap in the same manner as when this difference is zero. Thus, the largest possible frequency offset between the PRS signals of the serving and neighbor cell is 3. According to this embodiment, the remote unit sends a report to the serving cell including at least the PCID of the neighbor cell and the estimated TDOA if the criterion is satisfied.

In another embodiment where the remote unit determines if the estimated SQM satisfies the first criterion, at least one of the thresholds T_X1 or T_X2 is based at least in part on a signal received from the serving cell. For example, the signal received from the serving cell may be a system information message, or a LTE Positioning Protocol (LPP) message or a Radio Resource Control (RRC) message. In one embodiment, the signal received from the serving cell may indicate that the network is synchronous. In this instance, it may be beneficial to set a low value of the threshold T_X1 so long as the PRS of the serving cell and the neighbor cell do not overlap because in a synchronous network, there is less leakage of the serving cell PRS into the neighbor cell TDOA measurement. In another embodiment, the thresholds T_X1 and T_X2 may depend on the estimate of the neighbor frame offset (relative to the serving cell) provided in the LPP or RRC message. As the frame offset increases, the leakage from the serving cell PRS into the neighbor cell TDOA measurement is increased and thus a larger threshold T_X1 is required to prevent false detection In a related embodiment, at least one of the thresholds T_X1 or T_X2 is based on whether autonomous muting is enabled. In the event that autonomous muting is enabled, the threshold T_X1 can be set very low so long as the UE takes TDOA measurements only when it detects that the serving cell PRS transmission is muted. If autonomous muting is not enabled, then the value of the threshold T_X1 must be increased to prevent false detection. Furthermore, in the absence of autonomous muting, the threshold may be a function of the PCIDs of the serving and neighbor cell, and also of the frame offset.

In another embodiment where the remote unit determines if the estimated SQM satisfies the first criterion, at least one of the thresholds T_X1 or T_X2 is based on a serving cell signal power received at the wireless communication terminal. In one embodiment, the strength (SCSS) of a signal received from the serving cell corresponds to the PRS transmission received from the serving cell. In another embodiment, the strength (SCSS) of a signal received from the serving cell corresponds to a cell specific reference signal received from the serving cell. According to this aspect of the disclosure, the remote unit determines whether strength (SCSS) of a signal received from the serving cell satisfies a second criterion: threshold T_Y1<=SCSS<=threshold T_Y2. Here, the remote unit sends the report to the serving cell only if both the first and second criterions are satisfied. In this embodiment, at least one of the thresholds T_Y1 and T_Y2 may be based on whether autonomous muting is enabled. If autonomous muting is enabled, then in one embodiment, neighbor cell TDOA measurements may be taken only when the serving cell PRS transmission is muted. The threshold T_Y1 and T_Y2 may be used to detect that the serving cell PRS transmission is muted for a particular PRS (positioning) subframe. Alternatively, if autonomous muting is not enabled, the thresholds T_Y1 and T_Y2 may be used to determine whether or not the UE is sufficiently far from the serving cell such that serving cell interference does not significantly inhibit TDOA measurements on serving cells.

In another embodiment where the remote unit determines if the estimated SQM satisfies the first criterion, at least one of the thresholds T_X1 or T_X2 is based on the estimate of the frame timing offset between the serving cell and the neighbor cell provided by the network. An estimate of the frame timing offset can be provided by the network as a function of the cell to which the UE is attached. The UE then uses this estimated frame offset to center the search window that it uses to measure the TDOA. Alternatively, when the UE determines correlations for different hypothetical frame timing offsets over the search window (resulting in a vector of correlation values), The UE can threshold the correlation values against a vector of thresholds where the thresholds are different for different hypothetical frame timing offsets.

The positioning reference transmission from the serving base station 104 may be referred to herein as the serving positioning reference transmission (SPRT) 116. The positioning reference transmission from the neighbor base station 106 may be referred to herein as the neighbor positioning reference transmission (NPRT) 118. The positioning reference transmission from the serving site neighbor base station 112 may be referred to herein as a same site positioning reference transmission (SSPRT) 120. The UE device 102 may measure the time difference of arrival (TDOA) for each NPRT 118, to determine the distance between the UE device 102 and each observed neighbor base station 106.

The TDOA measurement in the presence of autonomous muting can be implemented using the following thresholding criterion: If serving the cell PRS received power (P-RSRP) falls below a threshold T_S on subframe n, the UE estimates P-RSRP for the neighbor cell PRS on subframe n and the UE estimates the neighbor cell TDOA. PRS transmission bandwidth is greater than 1.25 MHz and is less than or equal to the DL transmission bandwidth. The PRS transmission bandwidth is signaled to the UE in assistance information. If P-RSRP (for the neighbor cell)>threshold T_N, the UE sends a report with the TDOA estimate for this neighbor cell to the serving cell. In the absence of autonomous muting, the UE may implement the process without regard for the threshold T_S as follows: On subframe n, the UE estimates P-RSRP for the neighbor cell PRS on subframe n and the UE estimates the neighbor cell TDOA. If P-RSRP (for the neighbor cell)>threshold T_N, the UE sends a report to the serving cell.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication terminal, the method comprising:
    receiving a Positioning Reference Signal (PRS) transmission from a serving cell and a PRS from a neighbor cell;
    estimating a signal quality metric (SQM) based on the PRS of the neighbor cell;
    estimating a time difference of arrival (TDOA) measurement for the neighbor cell based on the PRS of the neighbor cell;
    determining if the estimated SQM satisfies a first criterion threshold T_X1<=SQM<=threshold T_X2, wherein at least one of the thresholds T_X1 or T_X2 is based at least in part on a signal received from the serving cell;
    sending a report to the serving cell that includes the estimated TDOA if the first criterion is satisfied;
    determining at least one of T_X1 and T_X2 based on a serving cell signal power received at the wireless communication terminal;
    determining whether a strength of a signal received from the serving cell satisfies a second criterion: threshold T_Y1<=SCSS<=threshold T_Y2; and
    sending the report to the serving cell only if the first and second criteria are satisfied.

2. The method of claim 1 wherein at least one of the thresholds T_Y1 and T_Y2 is based on whether autonomous muting is enabled.

3. The method of claim 1 wherein the signal received from the serving cell corresponds to the PRS of the serving cell.

4. The method of claim 1 wherein the signal received from the serving cell corresponds to a cell specific reference signal received from the serving cell.

5. The method claim 1 wherein the signal received from the serving cell is a system information message, a LTE Positioning Protocol message or a Radio Resource Control (RRC) message.

6. The method claim 1 wherein at least one of the thresholds T_X1 or T_X2 is based on whether autonomous muting is enabled.

7. The method of claim 1 where the signal quality metric corresponds to an estimation of power of the PRS of the neighbor cell.

8. The method of claim 1 further comprising:
   determining a noise measurement based on a signal from which an estimation of power of the PRS of the neighbor cell received at the wireless communication terminal was obtained;
   where the signal quality metric is based on an estimation of power of the PRS of the neighbor cell and the noise measurement.

9. The method of claim 1, further comprising sending the report to the serving cell that includes the PCID of the neighbor cell and the estimated TDOA if the criterion is satisfied.

10. A method in a wireless communication terminal, the method comprising:
   receiving a Positioning Reference Signal (PRS) from a serving cell and a PRS from a neighbor cell;
   estimating a signal quality metric (SQM) based on the PRS of the neighbor cell;
   estimating a time difference of arrival (TDOA) measurement for the neighbor cell based on the PRS of the neighbor cell;
   determining if the estimated SQM satisfies a criterion threshold T_X1<=SQM <=threshold T_X2, wherein at least one of the thresholds T_X1 or T_X2 is based on a frame timing offset between the serving cell and the neighbor cell;
   sending a report to the serving cell that includes the estimated TDOA if the criterion is satisfied;
   determining whether the serving cell PRS is muted during an occasion in which the neighbor cell PRS is received; and
   estimating the TDOA based on the PRS signal received during the occasion in which the serving cell PRS is muted, wherein at least one of the thresholds T_X1 or T_X2 is based on whether the serving cell PRS was muted.

11. The method of claim 10, wherein at least one of the thresholds T_X1 or T_X2 is based on a power of the PRS of the serving cell received at the wireless communication terminal and a power of the PRS of the neighbor cell received at the wireless communication terminal.

12. The method of claim 10 where the signal quality metric corresponds to an estimation of power of the PRS of the neighbor cell received at the wireless communication terminal.

13. The method of claim 10 further comprising:
   determining a noise measurement based on a signal from which an estimation of power of the PRS of the neighbor cell received at the wireless communication terminal was obtained;
   wherein the signal quality metric is based on the estimation of power of the PRS of the neighbor cell and the noise measurement.

* * * * *